United States Patent [19]

Gallant

[11] 3,805,153
[45] Apr. 16, 1974

[54] PHASE MEASUREMENT CIRCUIT
[75] Inventor: George A. Gallant, Burlington, Vt.
[73] Assignee: Simmonds Precision Products, Inc., Tarrytown, N.Y.
[22] Filed: Nov. 2, 1972
[21] Appl. No.: 303,205

[52] U.S. Cl. .............................. 324/83 A, 328/133
[51] Int. Cl. ...................... G01r 25/00, H03d 13/00
[58] Field of Search .......... 324/83 R, 83 A; 328/62, 328/63, 155, 133

[56] References Cited
UNITED STATES PATENTS
3,249,868  5/1966  Sheftelman ...................... 324/83 A
3,667,031  5/1972  Cox et al. .......................... 328/155

Primary Examiner—Alfred E. Smith
Attorney, Agent, or Firm—Edwin E. Greigg

[57] ABSTRACT

A phase measurement circuit having two integrators, one developing a first D.C. voltage proportional to a phase difference between two signals and a second developing a D.C. voltage proportional to 360° minus the phase difference. The voltages developed are summed and compared to a reference voltage and the resultant signal is applied to a differential amplifier whose output is a D.C. voltage proportional to the error and of a polarity indicative of the error direction. This error signal is fed back to the input of the integrators to compensate for errors that otherwise might exist due to conversion of phase voltages to D.C. voltages by correcting the phase reading and bringing the error back to zero.

11 Claims, 2 Drawing Figures

PHASE MEASUREMENT CIRCUIT

BACKGROUND OF THE INVENTION

Phase measurement is used in measuring many characteristics of rotating systems such as torque, horsepower, etc. wherein two alternating current detection signals are produced in which the phase difference is proportional to the characteristic being measured. The A.C. signals are converted by bistable multivibrators to square wave signals each having a duty cycle proportional to the phase difference. The square wave signals are integrated into a D.C. voltage signal having a level proportional to the phase difference being measured which can be compared and the resultant applied to a meter for direct readout.

The accuracy of the integrated D.C. voltage is directly dependent upon the ability of the signal sensors and the circuit to detect the zero crossing points of the two input signals accurately and without delay. At low frequencies the accuracy is high since the delay times and rise and fall times of semi-conductor devices which are used in the detection and integrating circuits are small compared to the cycle time or time between sensor signal pulses. As the frequency is increased, however, differences in the characteristics of semiconductor devices become more significant and can cause errors in the phase measurement.

Most circuits are made up of many semi-conductor components having rise and fall time and delay times which vary even among components of supposedly identical types. However, the errors created in the phase measurement by these components are in the same direction, but vary slightly in value. Measurement of two phase shifts 0° and 360° minus 0° wherein the errors are in the same direction can compensate for these errors by summing and comparing the developed phase signal to a further reference signal to thereby derive a correction signal that is used to cancel the errors which have developed. This specification describes the methods for achieving improved accuracy by error cancellation techniques combined into the phase measurement system.

It is therefore the primary object of this invention to provide a phase measurement circuit in which errors in measurement due to circuit component variations are cancellable to improve accuracy.

Another object of this invention is to provide a phase measurement circuit in which the rise and fall times of the zero crossing detector circuit is shortened to improve its accuracy at high frequencies.

Yet another object of this measurement invention is to provide a phase measurement circuit which will indicate if the sensor signals are below a specified minimum level necessary for the accuracy required.

Still another object of this invention is to provide a phase measurement circuit which will measure phase angle and its complementary phase angle for comparison with total cycle width to determine measurement error.

These and other objects will become clear upon careful study of the specification along with the drawings and the appended claims.

DESCRIPTION OF THE EMBODIMENTS

Figure 1:
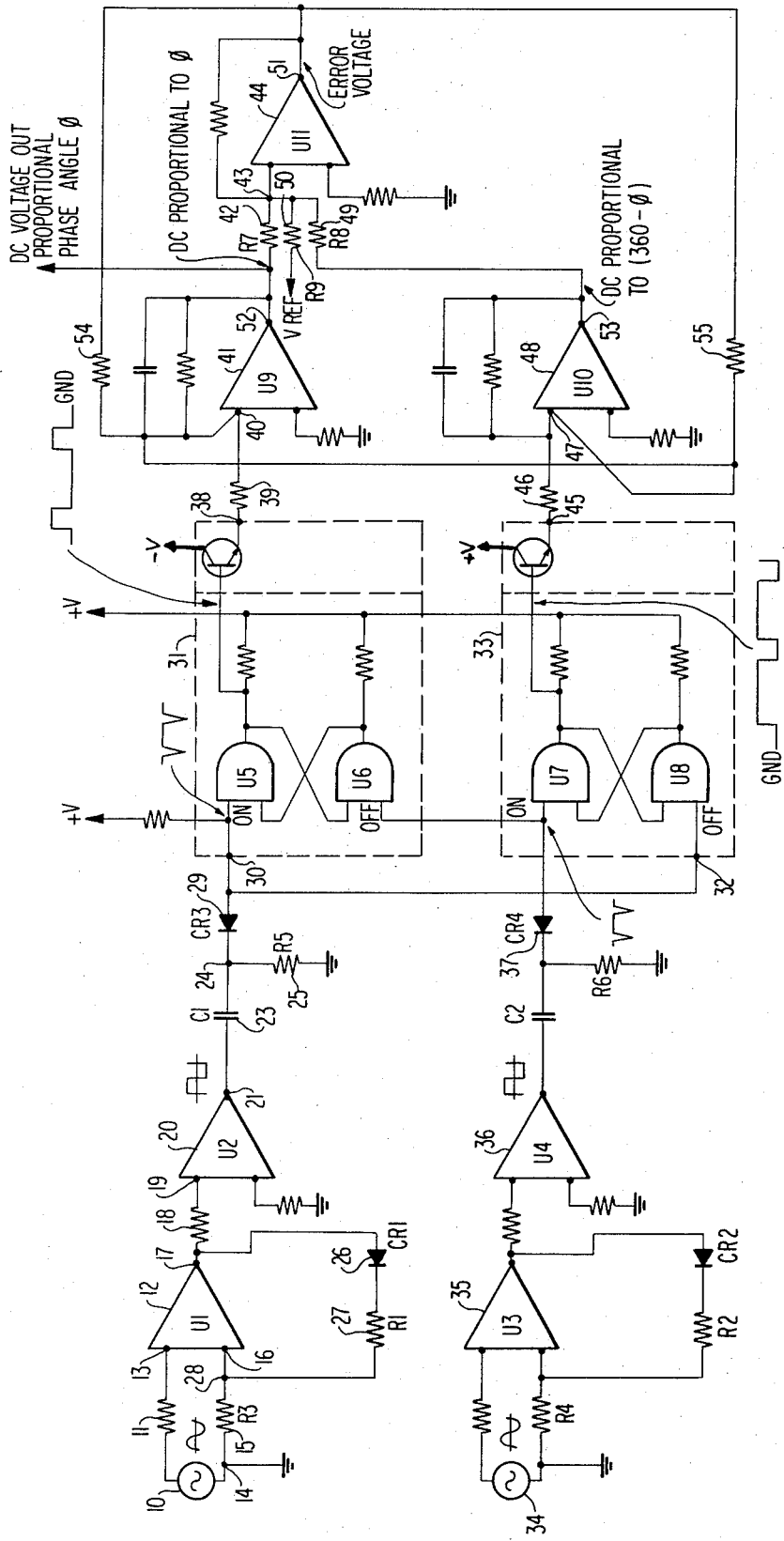
FIG. 1 shows a schematic of the preferred embodiment of the phase measurement circuit.

Referring to FIG. 1 there is shown a conventional magnetic sensor 10 having one end connected to resistor 11 which is, in turn, connected to the inverting input 13 of amplifier 12. The other end of magnetic sensor 10 is connected to ground at point 14. To the non-inverting input of amplifier 12 at point 16, is connected one end of resistor 15, the other side of which is grounded. The output of amplifier 12 taken at point 17 is connected through resistor 18 to the first input 19 of differential amplifier 20. Also connected to point 17 at the output of amplifier 12 is the anode of diode 26. The cathode of diode 26 is connected through resistor 27 to point 28 at input 16 of amplifier 12, thus forming a positive feedback loop. The output point 21 of amplifier 20 is connected to one side of capacitor 23, the other side of which is connected at point 24 to one lead of resistor 25, the other side of which is connected to ground.

The construction thus far comprises a zero crossing detector which operates as follows:

The signal generated by sensor 10 is approximately a sine wave and is amplified by amplifier 12 and fed to amplifier 20 where, because of its extremely high gain, the signal is converted onto a square wave. The sides of the square wave occur at the zero crossing points of the original sine wave. The feedback loop diode 26 and resistor 27 provides positive feedback which, when applied to the non-inverting input of amplifier 12, results in increased turn on speed for amplifier 12 and amplifier 20. This assures triggering at close to ground level thereby improving the accuracy of the zero crossing detection and the phase measurement at low frequencies and low amplitudes.

The amount of positive feedback is determined by the ratio of resistor 27 to resistor 15 and is used as a signal failure detection system. The positive feedback will maintain amplifiers 12 and 20 in their ON condition (output of amplifiers 12 and 14 are high) until the voltage on the inverting input 13 exceeds the feedback voltage, at which time the outputs go low. If the amplitude of the signal from magnetic sensor 10 becomes low or fails and the required input switching level is not exceeded, the output of amplifier 12 stays high and the system is disabled thereby indicating signal failure.

The output of the zero crossing detector is differentiated by the R.C. network formed by resistor 25 and capacitor 23 which generate a positive and negative spoke voltage corresponding to each zero crossing point.

Referring again to the circuit shown in the center portion of FIG. 1, the junction of capacitor 23 and resistor 24 is connected to the cathode of diode 29. The anode of diode 29 is connected to the ON input 30 of bistable multivibrator 31 and to the OFF input 32 of bistable multivibrator 33. Diode 29 is biased to block positive pulses and pass only negative pulses so that only one pulse per cycle is applied to the inputs of the multivibrators.

Referring to the lower half of the circuit of FIG. 1, as viewed in the drawing, there is provided a second magnetic sensor 34 and amplifiers 35 and 36 having an identical circuit construction as the circuit portion hereinbefore described. The output of amplifier 36 is differentiated and applied to diode 37. The output of diode 37 is connected to the ON input of bistable multivibrator 33 and the OFF input of bistable multivibrator 31.

It will be obvious to those skilled in the art that upon a signal from the first sensor 10 bistable multivibrator 31 will turn ON and bistable multivibrator 33 will turn OFF and upon signal from sensor 34 bistable multivibrator 31 will turn OFF and bistable multivibrator 33 will turn ON.

The output of bistable multivibrator 31 is a square wave whose duty cycle is determined by the ratio of the time between turn on and turn off to the total cycle time and is proportional to the phase shift measured by sensors 10 and 34.

In the same manner the output of bistable multivibrator 33 is also a square wave; however, since bistable multivibrator 31 turns ON when bistable multivibrator 33 turns OFF and vice versa, the duty cycle of the bistable multivibrator 33 is the complement of the duty cycle of bistable multivibrator, i.e., the duty cycle of one plus the duty cycle of the other equals 100 percent.

The output 38 of bistable multivibrator 31 is connected through resistor 39 to the input 40 of integrator 41. The output 52 of integrator 41 is connected through resistor 42 to resistor junction 43 formed at the input of D.C. amplifier 44. In the same manner the output 45 of multivibrator 33 is connected through resistor 46 to the input 47 of integrator 48. The output 53 of integrator 48 is connected through resistor 49 to junction 43. The integrators are advantageously set to provide a zero volt signal at zero phase shift and a 360 volt signal at 360° phase shift, however, this can be scaled to any value desired.

Also connected at junction 43 is a resistor 50, the other side of which is connected to a fixed reference voltage source equal to that required to 360° phase measurement.

The output of amplifier 44 which corresponds to the error voltage is connected through resistor 54 to the input 40 of integrator 41 and through resistor 55 to the input 47 of integrator 48. This portion of the circuit operates as follows.

Integrator 41 integrates the square wave appearing at the output 38 of bistable multivibrator 31 into a D.C. voltage proportional to its duty cycle which is also proportional to the phase angle 0 measured by sensors 10 and 34. Integrator 48 integrates the square wave appearing at the output 45 of bistable multivibrators 33 into a D.C. voltage proportional to its duty cycle which is also proportional to the phase angle (360° - 0°).

Each of these voltages contains errors due to circuit component variations and each tends to be in the same direction becuase the components are identical in each half of the circuit. The two D.C. voltages are summed in resistor network 42 and 49 and compared with the reference voltage derived through resistor 50. This voltage is accurately fixed to be proportional to a phase angle of 360° without error since component turn off and turn on times do not enter into its generation. The resulting voltage at the input of amplifier 44 is proportional to the difference between the reference voltage and the summed phase angle voltages which gives a D.C. output at point 51 proportional to the input and with a polarity dependent upon which voltage is higher.

In other words, the network consisting of resistors 42, 49 and 50, the point 43 and the input impedance of the amplifier 44 effect the algebraic addition of the voltage outputs from integrators 41 and 48 and the reference voltage V Ref. The voltage output or correction signal from amplifier 44 is fed back through resistor 54 to integrator 41 and through resistor 55 to integrator 48 where it corrects the output bringing the error to zero.

The output to the visual indicator is taken from the output 52 of integrator 41 as in all previous systems of this type.

Figure 2:
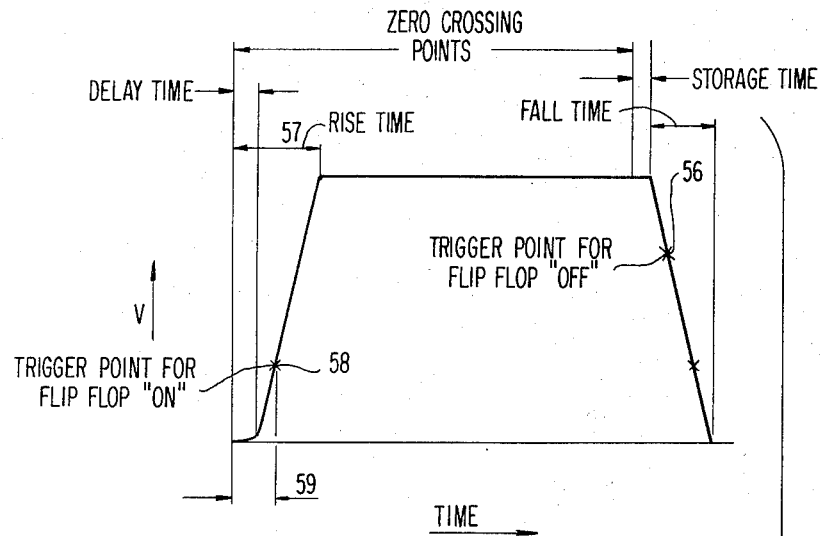
FIG. 2 shows graphs of the effect of delay times on error generation.
Figure 2:
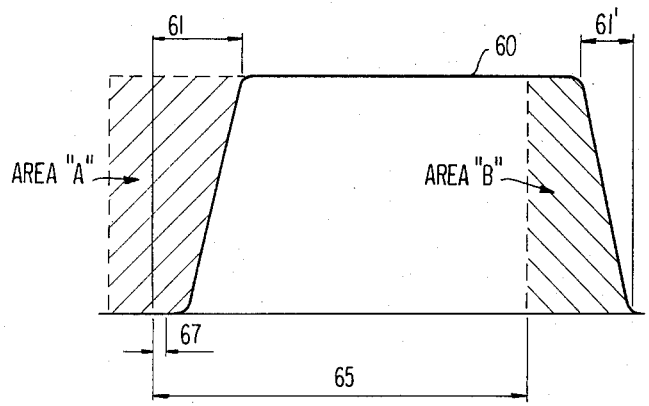
Figure 2:
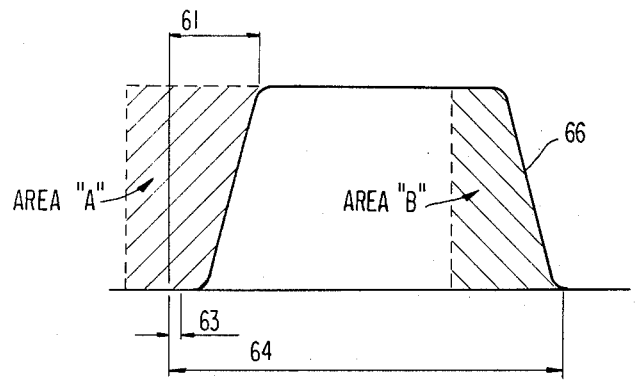

Referring to FIG. 2 there is shown one output cycle of the zero crossing detector square wave showing it beginning at zero and taking a finite time to rise to its max indicated by distance 57. At the other zero crossing it starts to fall but requires a finite time to go to zero. Since all electronic circuits have finite turn on times, the bistable multivibrator does not turn on until the voltage reaches point 58 which incurs a delay equal in time to distance 59. In the same manner, it does not start to turn "off" until point 56 is reached. The output of the bistable multivibrator square wave 60 also has finite rise and fall times and again introduces delays 61 and 61'. When the frequency is low, the effect of the delays is a very small percentage of the total cycle time and the error is small, however, as the frequency increases and the rise and fall times remain the same, one can see that the errors become an appreciable part of the cycle time as shown in higher frequency curve 66. The ideal output of the multivibrator is shown by the dotted lines. The actual output is shown by the solid lines. Because of differences in delay times, storage times, rise times and fall times, area A and area B may not be equal, therefore an error will exist. The error is the difference between A & B areas divided by the area under the dotted lines.

While a specific embodiment of the invention has been shown and described it will be apparent to those skilled in the art that variations thereto will readily suggest themselves and may be made without departing from the true spirit and scope of the invention. Accordingly, it is intended by the appended claims to cover all such variations and embodiments.

That which is claimed is:

1. A phase measurement and error correction circuit for providing a D.C. output voltage proportional to the phase difference between a pair of signals, the phase difference of which is proportional to a measured characteristic of a system comprising first means for developing a first D.C. voltage proportional to the phase difference of said pair of signals, second means for developing a second D.C. voltage proportional to 360° minus the phase difference of said pair of signals, summing means for summing said first and said second D.C. voltages and means for comparing the summed D.C. voltages and correcting for errors due to circuit component variations so as to provide the D.C. output voltage proportional to the phase difference between the pair of signals.

2. A phase measurement and error correction circuit as set forth in claim 1, wherein said first means includes a first sensing circuit for developing a signal proportional to a measured quantity and said second means includes a second sensing circuit for developing a reference signal proportional to a measured quantity, said reference signal being displaced by 360° with respect to said signal.

3. A phase measurement and error correction circuit as set forth in claim 2, wherein said first means and said second means each include a square wave generating circuit for developing a first square wave output signal and a second square wave output signal in response to said signal and said reference signal, respectively.

4. A phase measurement and error correction circuit as set forth in claim 3, wherein said signal and said reference signals are alternating and further including zero crossover circuits connected to receive each said signals, said zero crossover circuits being connected to said square wave generating circuits for controlling the rise and fall time of each generated square wave.

5. A phase measurement and error correction circuit as set forth in claim 4, wherein said square wave generating circuit comprises a bistable multivibrator having an ON input and an OFF input, and means connecting the ON input of one multivibrator to the output of the zero crossover circuit connected to receive the signal proportional to the measured quantity and the ON input of the other multivibrator to the output of the zero crossover circuit connected to receive the reference signal, the OFF output of said one multivibrator being connected to the input of said other multivibrator and the OFF output of said other multivibrator being connected to the input of said one multivibrator.

6. A phase measurement circuit as set forth in claim 5, including a first integrator connected to the output of said one multivibrator and a second integrator connected to the output of said other multivibrator.

7. A phase measurement circuit as set forth in claim 1, wherein said first means includes a first integrator and said second means includes a second integrator.

8. A phase measurement circuit as set forth in claim 7, wherein said means for comparing said summed D.C. voltages and correcting for errors includes a D.C. reference source, means connecting the D.C. reference source to the summed voltages to develop a correction signal and means for applying said correction signal to the inputs of said first and said second integrator.

9. A phase measurement circuit as set forth in claim 8, wherein said means for applying said correction signal includes a differential amplifier.

10. A phase measurement circuit as set forth in claim 1, wherein said means for comparing the summed D.C. voltages includes a D.C. reference voltage source connected to said summing means for developing a correction signal having a polarity dependent on the value of the first and second D.C. voltages.

11. A phase measurement circuit as set forth in claim 10, wherein said means for applying said correction signal includes a differential amplifier and means connected to feed back the output of said amplifier to said inputs of said first and said second integrators.

* * * * *